HIGH SPEED BINARY ADDER-SUBTRACTOR WITH CARRY RIPPLE

Filed Oct. 17, 1961 3 Sheets-Sheet 1

INVENTORS
WALTER A. HELBIG &
RONALD J. WOLDRICH
BY John V. Regan
ATTORNEY

HIGH SPEED BINARY ADDER-SUBTRACTOR WITH CARRY RIPPLE

Filed Oct. 17, 1961 3 Sheets-Sheet 2

INVENTORS
WALTER A. HELBIG &
RONALD J. WOLDRICH
BY John V. Regan
Attorney

INVENTORS
WALTER A. HELBIG &
RONALD J. WOLDRICH
BY John V. Regan
Attorney

United States Patent Office 3,198,939
Patented Aug. 3, 1965

3,198,939

HIGH SPEED BINARY ADDER-SUBTRACTOR WITH CARRY RIPPLE

Walter A. Helbig, Woodland Hills, and Ronald J. Woldrich, Northridge, Calif., assignors to Radio Corporation of America, a corporation of Delaware Filed Oct. 17, 1961, Ser. No. 145,695
7 Claims. (Cl. 235—175)

This invention relates to binary adding and subtracting devices, and particularly to a high speed arrangement of such devices using a minimum number of circuits.

Concurrently filed, common assigned applications, Serial No. 145,594 by W. Helbig et al. (now abandoned), and Serial No. 145,696 by W. Helbig disclose arrangements of high speed propagating circuits which require a minimum amount of circuitry and which result in a minimum time delay. In the Helbig et al. case, there are described improved arrangements of ripple gates which require only three logic circuits to form an appropriate carry (or borrow) signal in a single delay time. These carry ripple gates are connected in series. Alternate ones of the gates provide a true carry (or borrow) signal, and the other alternate ones of the gates provide a complemented carry (or borrow) signal. In the Helbig case, Serial No. 145,696 (now abandoned), there are provided improved arrangements of carry anticipation circuitry using these carry ripple gates wherein a given specified anticipation is achieved with a minimum number of additional gating circuits.

It is an object of the present invention to enhance the usefulness of the afore-mentioned carry ripple and anticipation circuits by providing novel sum stages which are arranged to combine the output signals from the ripple gates and anticipation circuits to form required sum (or difference) signals.

Another object of the present invention is to provide improved binary devices which are arranged to form sum or difference signals in a novel manner using both the $n$ and $n-1$ carry signals to form the $n$th sum signal in alternate ones of the stages. In the other alternate stages, only the $(n-1)$ carry signals are required. In the case of binary subtractors, the $n$th and $n+1$ borrow signals are used to form the difference signals in the alternate stages.

The present invention also provides improved arrangements for obtaining a modulo two sum or difference of two binary numbers. This modulo two result is used in various applications such as complementing, masking, and other operations useful in data processing apparatus. This modulo two sum is also commonly referred to as a "logical" sum or difference and also as the "exclusive-or" operation.

In order to shorten the following description, the invention is described in connection with a binary adder. However, it is to be understood that the invention is equally applicable to a binary subtractor when a borrow signal is considered in place of the carry signal.

A binary adder according to the present invention has $n$ sum stages arranged to produce, as desired, either a resulting number $R_1$ through $R_n$ corresponding to a binary sum of two $n$ digit numbers, or a modulo two sum of these two numbers. The sum stages are arranged in ordered sequence to receive like ordered digits of the two numbers. Alternate ones of the sum stages are arranged to receive both the immediate carry signal ($n$) and the next preceding carry signal $(n-1)$. The immediate carry signal, for example $C_n$, is the carry signal resulting from the $n$th summand digits and the $C_{n-1}$ carry digit. The other alternate ones of the sum gates receive the preceding carry signals $(n-1)$. Each $n$th sum stage also receives the $n$th summand signals of the two numbers.

By thus arranging the sum stages, only three gating units are required in each sum stage, and these three gating units delay the incoming signals by only one time unit.

A feature of the invention resides in the use of signals in the sum stages which signals are used in the process of generating the carry signals in the high speed carry anticipation circuitry.

Another feature of the invention resides in the use of a control level which is applied to certain of the logic circuits of the summand carry stages. When the control level is one value, say low, a binary sum is generated, and when the control level is at a high value, a logical sum is generated.

In the accompanying drawing.

As described above, the present invention is used with the carry ripple and anticipation circuits disclosed in the mentioned copending applications. However, it is to be understood that the novel sum stages of the present invention can be used in any adder or subtractor devices where the appropriate input signals applied to the sum stages are generated.

Figure 1:
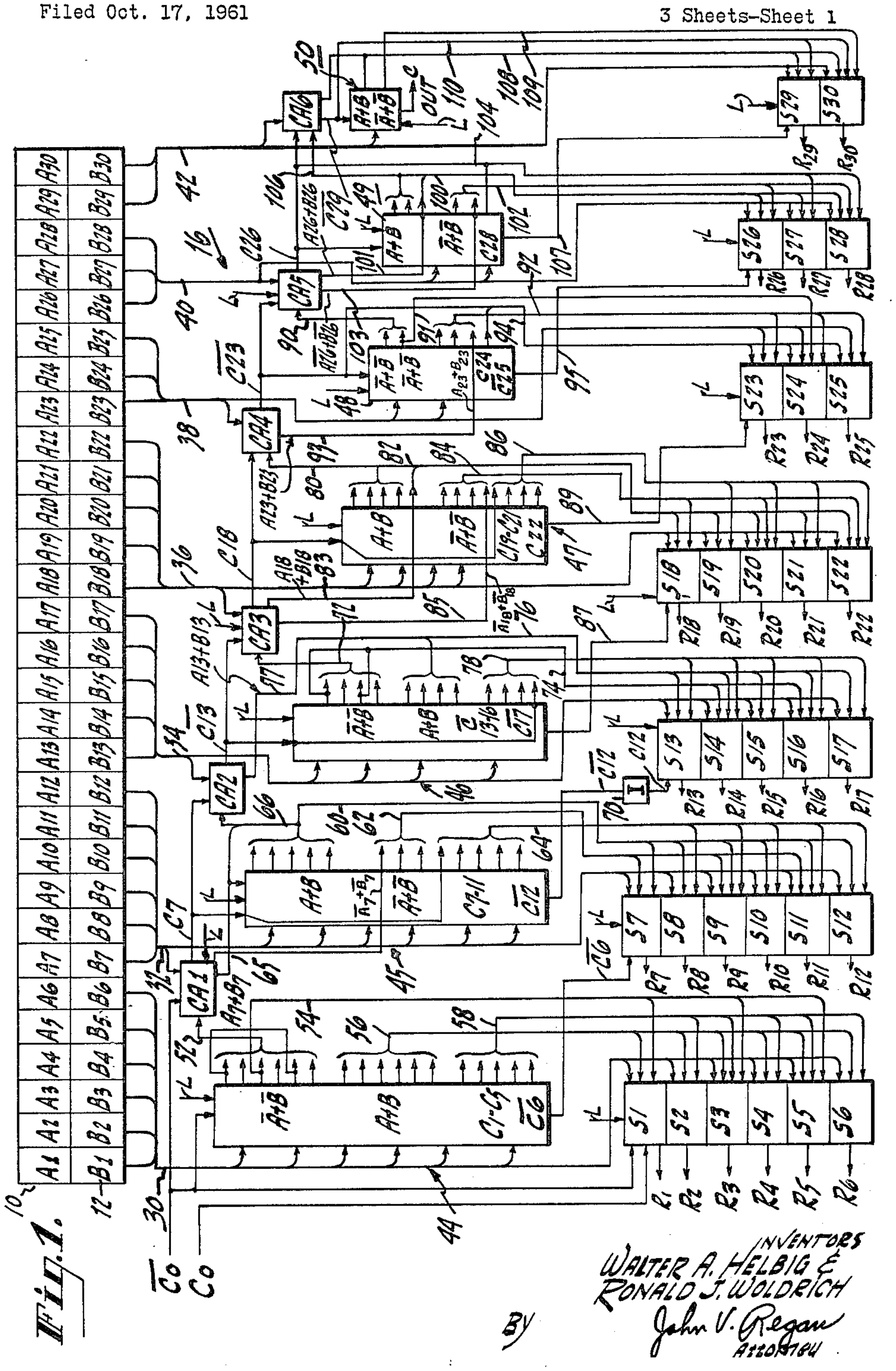
FIGURE 1 is a schematic diagram of an adder circuit arranged according to the invention.

For purposes of illustration, the adder of FIGURE 1 is indicated as having thirty stages $S_1$ through $S_{30}$ for producing thirty output signals $R_1$ through $R_{30}$ in accordance with the signals provided by two input binary numbers $A_1$ through $A_{30}$ and $B_1$ through $B_{30}$. The two A and B numbers may be applied from any suitable source to the adder device but conveniently are applied from two registers 10 and 12. Each of these registers may be a flip-flop register having thirty flip-flop circuits each arranged to store one digit of the thirty digits in the A and B numbers. The A number is stored in the A register 12 and the B number is stored in the B register 14. Each flip-flop, in conventional fashion, has set and reset inputs and corresponding "1" and "0" outputs. The levels of the "1" and "0" outputs are complementary, that is, one high relative to the other. It will be assumed herein that when the flip-flop is set, the "1" output is, say low, relative to the "0" output. When the flip-flop is reset, the "0" output is low relative to the "1" output. The one output of any one flip-flop is designated by the register letter A or B followed by the flip-flop number, for example $A_{17}$. The "0" output is designated in the same way with a bar over the quantity, for example $\overline{A}_{17}$. Both "1" and "0" outputs, A and $\overline{A}$ or B and $\overline{B}$, of each flip-flop are used in the adder.

The outputs of the two registers are applied to high speed carry circuitry 16 and to the sum stages $S_1$ through $S_{30}$. For convenience of drawing, either single lines or cables are shown connected between circuits. The cables are indicated by an appropriate cable symbol. A dash between two numbers indicates that all the signals between the lower and higher ones of the numbers are being considered. A cable 30 connects the outputs of the register stages $A_1$ through $A_6$ and $B_1$ through $B_6$ to the anticipation circuitry 16 and to the sum stages $S_1$ through $S_6$, respectively. Cable 32 connects the outputs of register stages $A_7$ through $A_{12}$ and $B_7$ through $B_{12}$ to the anticipation circuitry 16 and to sum stages $S_7$ through $S_{12}$. Cable 34 connects register stages $A_{13}$ through $A_{17}$ and $B_{13}$ through $B_{17}$ to the anticipation circuitry 16 and to the sum stages $S_{13}$ through $S_{17}$. Cable 36 connects the outputs of register stages $A_{18}$ through $A_{22}$ and $B_{18}$ through $B_{22}$ to the anticipation circuitry 16 and to the sum stages $S_{18}$ through $S_{22}$. Cable 38 connects the outputs of register stages $A_{23}$ through $A_{25}$ and $B_{23}$ through $B_{25}$ to the anticipation circuitry 16 and to the sum stages $S_{23}$ through $S_{25}$. Cable 40 connects register stages $A_{26}$ through $A_{28}$ and $B_{26}$ through $B_{28}$ to the anticipation circuitry 16 and to the sum stages $S_{26}$ through $S_{28}$. Cable 42 connects the outputs of register stages $A_{29}$ through $A_{30}$ and $B_{29}$ through $B_{30}$ to the anticipation circuitry 16 and to sum stages $S_{29}$ through $S_{30}$.

The anticipation circuitry 16 includes a chain of carry anticipation circuits CA1, CA2, CA3, CA4, CA5 and CA6. Seven strings 44, 45, 46, 47, 48, 49 and 50 of carry ripple gates are also provided. It will be assumed that it is desired to arrange the anticipation circuitry 16 so that a maximum carry delay of seven units is obtained. That is, effectively 23 of the 30 adder stages are anticipated across. This means that the maximum delay of any series arrangement of carry ripple gates alone or carry anticipation circuits and their connected carry ripple gates does not exceed seven units. The first string 44 has six ripple gates $C_1$ through $C_6$ for purposes later explained. The second string 45 has five carry ripple gates $C_8$ through $C_{12}$ and is connected at a junction point between the first and second carry anticipation circuits CA1 and CA2. The third string 46 has four carry ripple gates $C_{14}$ through $C_{17}$ and is connected at a junction point between carry anticipation circuits CA2 and CA3. The fourth string 47 has four carry ripple gates $C_{19}$ through $C_{22}$ and is connected at a junction point between the third and fourth carry anticipation circuits CA3 and CA4. The fifth and sixth strings 48 and 49 each has two carry ripple gates in series. The fifth string 48 is connected at a junction point between the fourth and fifth carry anticipation circuits CA4 and CA5. The sixth string 49 is connected at a junction point between the carry anticipation circuits CA5 and CA6. The final string 50 of the carry ripple gate $C_{30}$ is connected in series with the preceding six carry anticipation circuits CA1 through CA6.

A control level L is applied to each of the sum stages, and to each carry ripple gate which receives a complemented carry input signal $\bar{C}$, and to each carry anticipation circuit that receives a complemented input carry, for example CA1, CA3 and CA5. The control level L as described hereinafter is used in obtaining the logical sum of the two operands.

Figures 2, 3, 4:
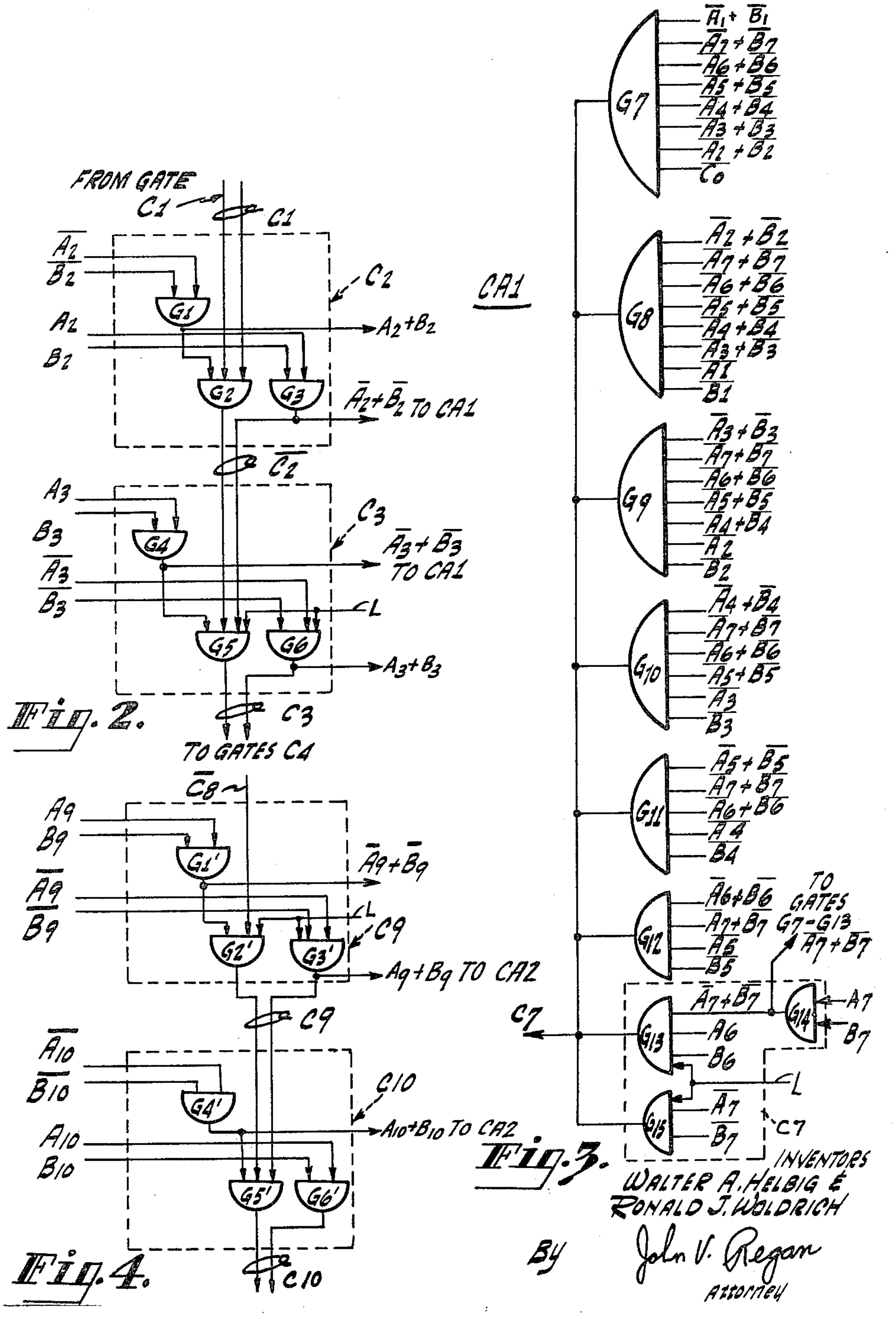
FIGURE 2 is a logic diagram of one pair of carry ripple gates used in the adder of FIGURE 1.
FIGURE 3 is a schematic diagram of the carry anticipation circuit CA1 of FIGURE 1.
FIGURE 4 is a logic diagram of another pair of carry ripple gates used in the adder of FIGURE 1.

FIGURE 2 is a logic diagram of a pair of suitable carry ripple gates which may be used in any of the strings 44 through 50. For purposes of illustration, the two ripple gates $C_2$ and $C_3$ in the first string 44 are shown. Each of the other carry ripple gates is arranged identical to one of the carry ripple gates $C_2$ or $C_3$ except for the use of different ones of the A, B and carry signals. This particular arrangement of carry ripple gates is described in the above-referenced copending application, Serial No. 145,594, by W. Helbig et al.

Each ripple gate has three logic circuits. The first circuit $G_1$ combines the summand signals $\bar{A}_2$, $\bar{B}_2$. The output of the first circuit $G_1$ is combined with the input carry signal $C_1$ in a second logic circuit $G_2$. The third logic circuit $G_3$ combines the input signals $A_2$, $B_2$. The outputs of the logic circuits $G_2$ and $G_3$ together provide the output carry signal $\bar{C}_2$. A small circle around these two leads are used to indicate that the desired carry signal is represented by the signals appearing on both these leads. That the ripple gate $C_2$ provides the proper carry can be shown by Equation 1 below, where *k* represents the gate number, the + sign between terms represents a logic "or" proposition, and the dot between terms indicates a logic "and" proposition. The same representation is used in each of the other equations herein.

$$(1)\qquad \overline{C_{k+1}}=\underbrace{\overline{A_k \cdot B_k}}_{G_3}\cdot\underbrace{\overline{C_k\underbrace{(A_k+B_k)}_{G_1}}}_{G_2}$$

The brace beneath the various terms is used to indicate the correspondence between the different terms of Equation 1 and the logic circuits of the ripple gate $C_2$. The separate outputs $(A_2+B_2)$ and $\bar{A}_2+\bar{B}_2$ from the logic circuits $G_1$ and $G_3$, respectively, are also used as described more fully hereinafter.

Each of the logic circuits may be a diode "and" gate and a transistor amplifier where the collector of the transistor is normally at a relatively low level and rises to a relatively high level only when all the inputs to the diode gate are present. When any of the inputs are not present, the transistor output level remains low. This particular logic circuit is known in the art and is described, for example, in an article by De Sautels, entitled "The Versatile Transistor NOR Circuit," published in the May 1960, issue of "Control Engineering," pages 101–104. Each separate input to a circuit block represents one diode input to the logic circuit "and" gate. In practice, the diode gate can receive as many as 10 or so inputs and provide as many as 10 or so outputs.

Note that the carry input to the following ripple gate $C_3$ is $\bar{C}_2$. The input to ripple gate $C_2$, however, was $C_1$. The output of ripple gate $C_3$ is carry signal $C_3$. The alternation continues through the string of ripple gates with successive carries alternating between complemented and true forms. The ripple gate $C_3$ is arranged different from ripple gate $C_2$ in order to avoid the necessity of an extra inverting circuit to change the $\bar{C}_2$ output signal to $C_2$. In the ripple gate $C_3$ the upper logic circuit $G_4$ receives the input signals $A_3$, $B_3$. The output of gate $G_4$ is combined with the input carry signal $\bar{C}_2$ appearing on the two leads from $C_2$ in a logic circuit $G_5$. The logic circuit $G_6$ combines the input signals $\bar{A}_3$, $\bar{B}_3$. The outputs of gates $G_5$ and $G_6$ together provide the output carry signal $C_3$. This carry signal is combined with the next summand signals $A_4$, $B_4$ and $\bar{A}_4$, $\bar{B}_4$ in a following carry ripple gate $C_4$ to produce the output carry signal $\bar{C}_4$, and so on. Also, the outputs $(A_3+B_3)$ and $\bar{A}_3+\bar{B}_3$ of gates $G_4$ and $G_6$ are used as described more fully hereinafter.

That the ripple gate $C_3$ provides a proper carry signal for all combinations of input signals can be seen from Equation 2.

$$(2)\qquad C_k=\underbrace{(A_k+B_k)}_{G_6}\underbrace{(C_{k-1}+\underbrace{A_k \cdot B_k}_{G_4})}_{G_5}$$

The control level L is also applied to the logic circuits $G_5$ and $G_6$ of each odd numbered ripple gate. During a binary add operation, the L level is low which in effect applies a binary "1" to the gates $G_5$ and $G_6$. During a logical add operation, the L level is changed to a high value, or "0," which in effect inhibits the gates $G_5$ and $G_6$ and maintains both leads of the $C_3$ signal at a low level (corresponding to a "1").

The strings 44 through 50 of carry ripple gates are all arranged in similar fashion with alternate gates implementing one of the Equations 1 and 2, and the other alternate gates implementing the other of the two equations. The first ripple gate of the first string 44 may be arranged according to either one of Equations 1 or 2 as desired, since normally both inputs $C_0$ and $\bar{C}_0$ are present. In the present example, a $\bar{C}_0$ input is used. The input carry signal $\bar{C}_0$ is in a nature of an operate signal and, in practice, is applied at the same time as or shortly before the A and B summand signals. The level $\bar{C}_0$ is normally low during an addition operation. A high level $C_0$ signal is used when the adder is used to perform binary subtraction. The first gate $C_1$ then implements Equation 2 above.

The first ripple gate of each of the other strings 45 through 50 is determined by the output of the first carry anticipation circuit CA1. This output may be either a carry signal or its complement (indicated by a bar), as desired. This chosen CA1 output then fixes the alternation between the two types of logic circuits in the succeeding strings. The chosen CA1 output also fixes the alternations of the succeeding carry anticipation circuits CA2 through CA6. In the present example, the $\overline{C}_0$ signal is applied to the first carry anticipation circuit CA1 so that the output signal $C_7$ is produced. Thus, the second anticipation circuit CA2 and the second string 45 of ripple gates are arranged to process the input carry signal $C_7$.

The logic diagram for the first carry anticipation circuit CA1 is shown in FIGURE 3. Six anticipation gates $G_7$ through $G_{12}$ are used to provide carry anticipation across the first seven sum stages $S_1$ through $S_7$. Additionally, a ripple gate $C_7$ including logic circuits $G_{13}$ through $G_{15}$ is included as a part of the anticipation circuit CA1. The logic circuits $G_{13}$ through $G_{15}$ are used to form a carry or a not carry signal in dependence upon the $A_6$, $B_6$ and $A_7$, $B_7$ input signals. The gate $C_7$ essentially corresponds to one of the carry ripple gates of FIGURE 2 except that no carry input signal is required. The first anticipation gate $G_7$ anticipates across all the first seven stages $S_1$ through $S_7$. It is seen by inspection that the gate $G_7$ produces a low level output except when the $\overline{C}_0$ signal is present and at least one of the A and B inputs is present in each of the register stages $A_1$, $B_1$ through $A_7$, $B_7$. Each of the $(\overline{A}+\overline{B})$ inputs except $\overline{A}_7+\overline{B}_7$ is provided by the appropriate outputs of the carry ripple gates $C_1$ through $C_6$ of FIGURE 2 via a cable 52. The $\overline{A}_7+\overline{B}_7$ input is provided by the output of logic circuit $G_{14}$ of FIGURE 3.

The second anticipation gate $G_8$ anticipates across the next six sum stages $S_2$ through $S_7$. It can be seen by inspection that gate $G_8$ provides its normally high output except when both $\overline{A}_1$ and $\overline{B}_1$ signals are present together with one or the other of the signals in every one of the pairs of digits $A_2$, $B_2$ through $A_7$, $B_7$. At such time the output changes from its low level to a high level thereby generating the carry out signal $C_7$. In similar manner, the third gate $G_9$ anticipates across the next five sum stages $S_1$ through $S_5$, and the successive other gates $G_{10}$ through $G_{12}$ each anticipate across one less sum stage.

It should be observed that the total number of additional gates for the anticipation function is equal to six, and these six gates anticipate across the first seven adder stages $S_1$ through $S_7$. The three logic circuits, $G_{13}$, $G_{14}$ and $G_{15}$ in the gate $C_7$ are required in any event when carry ripple is used. Also, observe that the carry out signal $C_7$ has a maximum delay of one unit.

The control level L is also applied to the logic circuits $G_{13}$, $G_{15}$ of the gate $C_7$. The L level is also applied to the ripple gates in each of the anticipation circuits CA3 and CA5, since each of these receives a complemented carry signal.

The $C_7$ signal is applied to the first ripple gate of second string 45 of FIGURE 1 and to the second carry anticipation circuit CA2.

FIGURE 4 is a logic diagram of the two of the ripple gates in the second string 45, for example $C_9$, $C_{10}$. These two gates are arranged in similar manner to the gates $C_3$ and $C_2$, respectively, of FIGURE 2. Gates $G_1'$, $G'_2$ and $G_3'$ correspond to gates $G_4$, $G_5$ and $G_6$, respectively. The control signal L is applied to the two bottom circuits $G_2'$ and $G_3'$ of odd numbered ripple gate $C_9$. Note, however, that the outputs from gates $C_9$ and $C_{10}$ to the anticipation circuit CA2 are the complements of those supplied by the gates $C_2$ and $C_3$ of FIGURE 1. The $(A_9+B_9)$ and $(A_{10}+B_{10})$ outputs are required because the carry input of the second anticipation circuit CA2 is $C_7$ instead of the not carry signal $\overline{C}_0$ in the case of the first anticipation circuit CA1. Details of other arrangements of anticipation circuits are given in the above-mentioned co-pending application of W. Helbig, Serial No. 145,696 (now abandoned).

In FIGURE 1, the third anticipation circuit CA3 receives the carry output signal $\overline{C}_{13}$ and has a total of four additional gates to anticipate across the five sum stages $S_{13}$ through $S_{16}$ and an additional ripple gate to anticipate across the sum stage $S_{17}$. These gates are arranged in the same manner as the anticipation gates of the first anticipation circuit CA1. The output of the third anticipation circuit CA3 is $C_{18}$ which is applied to the fourth anticipation circuit CA4. The circuit CA4 requires four additional gates to anticipate across the sum stages $S_{18}$ through $S_{21}$ and has a ripple gate $C_{22}$ to anticipate across the sum stage $S_{22}$.

The output of the circuit CA4 is $\overline{C}_{23}$ which is applied to the fifth anticipation circuit CA5. This circuit has two additional gates to anticipate across the sum stages $S_{23}$ and $S_{24}$ and an additional ripple gate to anticipate across sum stage $S_{25}$. The output of the CA5 is $C_{26}$ which is applied to the sixth anticipation circuit CA6. The CA6 circuit has two additional gates to anticipate across the sum stages $S_{26}$ and $S_{27}$ and an additional ripple gate to anticipate across the sum stage $S_{28}$. The output of the CA6 circuit is $\overline{C}_{29}$ which is applied to the input of the final string 50 of the ripple gates.

The total number of additional gates required in the anticipation circuits CA1 through CA6 is $$6+5+4+4+2+2$$

which is equal to 23. It should be noted that the 23 additional gates used in these circuits equal the minimum number required to anticipate across 23 stages of the 30 stage adder in order to achieve the desired carry delay of seven units.

Referring again to FIGURE 1, the six $\overline{A}+\overline{B}$ outputs of the ripple gates of the first string 44 are applied via a cable 52 to the carry anticipation circuit CA1. This latter circuit also receives the $A_7$, $B_7$ and $\overline{A}_7$, $\overline{B}_7$ inputs via a tap from the cable 32. The $\overline{A}+\overline{B}$ outputs of the ripple gates $C_1$, $C_3$ and $C_5$ are also applied via a cable 54 to the sum gates $S_1$, $S_3$ and $S_5$, respectively. The $(A+B)$ outputs of the six ripple gates $C_1$ through $C_6$ are applied via a cable 56 to corresponding ones of the sum stages $S_1$ through $S_6$. The carry outputs $C_1$ through $C_5$ of the first five ripple gates are applied via a cable 58 to the sum stages $S_2$ through $S_6$, respectively. The first sum stage $S_1$ also receives the $C_0$ and $\overline{C}_0$ inputs. The $\overline{C}_6$ output of the final ripple gate in the first string 44 is applied to the sum stage $S_7$. The five $(A+B)$ outputs of the second string 45 of ripple gates are applied via a cable 60 to the sum stages $S_8$ through $S_{12}$. The $\overline{A}+\overline{B}$ outputs of the ripple gates $C_7$, $C_9$ and $C_{11}$ are applied via a cable 62 to sum stages $S_7$, $S_9$ and $S_{11}$. The carry outputs $C_7$ through $C_{11}$ of the first five carry gates of the string 45 are applied via a cable 64 to the sum stages $S_8$ through $S_{12}$, respectively. The $(A_7+B_7)$ output of the carry anticipation circuit CA1 is taken by way of a line 65 and applied via the cable 60 to the sum stage $S_7$. The six $(A+B)$ outputs are applied also via cable 66 to the second carry anticipation circuit CA2. The circuit CA2 also receives the $A_{13}$, $B_{13}$ and $\overline{A}_{13}$, $\overline{B}_{13}$ inputs from the cable 34.

The $\overline{C}_{12}$ output of the second string 45 of ripple gates is applied via an inverter 70 to the sum stage $S_{13}$. The output of the inverter 70 is $C_{12}$. The reason for the use of an inverter at this particular point will be described later. The four $(\overline{A}+\overline{B})$ outputs of the ripple gates $C_{14}$ through $C_{17}$ of the third string 46 are applied to the third anticipation circuit CA3 via a cable 72. The $\overline{A}+\overline{B}$ outputs of the ripple gates $C_{14}$ and $C_{16}$ are also applied via a cable 74 to the sum stages $S_{14}$ and $S_{16}$. The four $(A+B)$ outputs of the ripple gates $C_{14}$ through $C_{17}$ also are applied via a cable 76 to the sum stages $S_{14}$ through $S_{17}$, respectively. The $(A_{13}+B_{13})$ output of the anticipation circuit CA2 is applied via a line 77 and the cable 76 to the sum stage $S_{13}$. The carry outputs $\overline{C}_{13}$, $C_{14}$, $\overline{C}_{15}$ and $C_{16}$ are applied via a cable 78 to the sum stages $S_{13}$ through $S_{17}$. The carry signal $\overline{C}_{13}$ is applied to both sum stages $S_{13}$ and $S_{14}$ as will be apparent when these sum stages are described. The carry output signal $\overline{C}_{17}$ is applied to the sum stage $S_{18}$.

The four $(A+B)$ outputs of the fourth string 47 are applied via a cable 80 to the fourth carry anticipation circuit CA4, and via a cable 82 to the sum stages $S_{19}$ through $S_{22}$. The $(A_{18}+B_{18})$ output of the anticipation circuit CA3 is applied via a line 83 and the cable 82 to the sum stage $S_{18}$. The three $\overline{A}+\overline{B}$ outputs of the ripple gates of the string 47 are applied via a cable 84 to the sum stages $S_{18}$, $S_{20}$ and $S_{22}$. The $\overline{A}_{18}+\overline{B}_{18}$ output of the anticipation circuit CA3 is applied via a line 85 and the cable 82 to the sum stage $S_{18}$. The carry signals $C_{18}$, $\overline{C}_{19}$, $C_{20}$, $\overline{C}_{21}$ are applied via a cable 86 to the sum stages $S_{18}$ through $S_{22}$. The final carry signal $S_{22}$ is applied via a line 89 to the sum stage $S_{23}$.

The two $\overline{A}+\overline{B}$ outputs of the fifth string 48 of ripple gates are applied via a cable 90 to the carry anticipation circuit CA5. This circuit also receives the $A_{25}$, $B_{25}$ and $\overline{A}_{26}$, $\overline{B}_{26}$ signals from cable 40. The $\overline{A}+\overline{B}$ output of carry ripple gate $C_{24}$ is applied via a line 91 to the sum stage $S_{24}$. The $(A+B)$ outputs of the ripple gates $C_{24}$ and $C_{25}$ are applied via a cable 92 to the sum stages $S_{24}$ and $S_{25}$. The $(A_{23}+B_{23})$ output of anticipation circuit CA4 is applied via a line 93 and the cable 92 to the sum stage $S_{23}$. The carry signals $\overline{C}_{23}$ and $C_{24}$ are applied via a cable 94 to the sum stages $S_{23}$ through $S_{25}$. Both sum stages $S_{23}$ and $S_{24}$ receive the carry signal $\overline{C}_{23}$. The carry output signal $\overline{C}_{25}$ is applied via a line 95 to sum stage $S_{26}$.

The $(A+B)$ outputs of the ripple gates $C_{27}$ and $C_{28}$ of the sixth string 49 are applied via a cable 100 to the sum stages $S_{27}$ and $S_{28}$. The $(A_{26}+B_{26})$ output of the anticipation circuit CA5 is applied via a line 101 and cable 100 to the sum stage $S_{26}$. The $\overline{A}+\overline{B}$ output of ripple gate $C_{28}$ is applied via a cable 102 to the sum stage $S_{28}$. The $\overline{A}_{26}+\overline{B}_{26}$ output of the anticipation circuit CA5 is applied via a line 103 and cable 102 to the sum stage $S_{26}$. The carry signals $C_{26}$, $\overline{C}_{27}$ are applied via a cable 104 to the sum stages $S_{27}$ and $S_{28}$. The $(A+B)$ outputs of the ripple gates $C_{27}$ and $C_{28}$ are also applied via a cable 106 to the carry anticipation circuit CA6. This circuit also receives the $A_{29}$, $B_{29}$, $\overline{A}_{29}$, $\overline{B}_{29}$ signals from the cable 42. The output $\overline{C}_{29}$ of the anticipation circuit CA6 is applied to the final string 50 of ripple gates. The ripple gates $C_{30}$ in this string provides the $C_{OUT}$ signal which indicates, for example, an overflow condition in the adder circuit. The $C_{28}$ signal from the sixth ripple string 49 supplied via a line 107 to the sum stage $S^{29}$. The $(A+B)$ signals from the ripple gate $C_{29}$ of anticipation circuit CA6 and ripple gate $C_{30}$ of the final string 50 are applied via a cable 108 to sum stages $S_{29}$ and $S_{30}$. The $\overline{A}+\overline{B}$ output of ripple gate $C_{30}$ is applied to sum stage $S_{30}$ via a line 109. The carry signal $\overline{C}_{29}$ from the sixth anticipation circuit CA6 is applied to sum stage $S_{30}$ via a line 110.

It should be noted that, as arranged in FIGURE 1, odd numbered ones of the sum stages receive only one carry input signal in complemented form. The two exceptions are $S_1$ which receives both $C_0$ and $\overline{C}_0$ and the sum stage $S_{13}$ where the inverter 70 is employed to change the carry signal $\overline{C}_{12}$ to $C_{12}$. Even numbered ones of the sum stages receive the next preceding carry signal in true form and its own order carry signal in complemented form. Additionally, the even numbered sum stages receive the A, B and $\overline{A}$, $\overline{B}$ signals and the $(A+B)$ signals, the latter signal being applied from the carry anticipation circuitry. The odd numbered sum stages receive the A, B and $\overline{A}$, $\overline{B}$ signals and the $(A+B)$ and $(\overline{A}+\overline{B})$ signals, the latter two being applied from the anticipation circuitry. Thus, two separate types of sum stages are provided to take advantage of signals which are required to be generated in the high speed anticipation circuitry.

Figure 5:
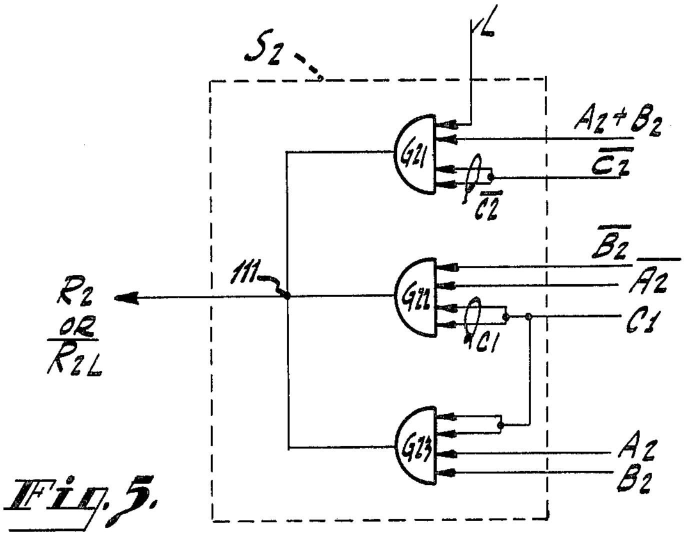
FIGURE 5 is a logic diagram of one of the types of sum stages used in the adder circuit; and, FIGURE 6 is a logic diagram of the other type of sum stage used in the adder of FIGURE 1.

A logic diagram is given in FIGURE 5 of one of the even numbered gates, for example $S_2$. The $S_2$ stage has three logic gates $G_{21}$, $G_{22}$ and $G_{23}$ whose outputs are connected to a common point 111 at which the output signal $R_2$, in the case of a binary sum, or $\overline{R}_{2L}$ in the case of a logical addition occur. The top gate $G_{21}$ receives the $(A_2+B_2)$ input signal from the carry ripple gate $C_2$ of the first string 44 of FIGURE 1. The $\overline{C}_2$ signal is also applied to the gate $G_{21}$. It will be recalled that each of the carry signals is presented by way of two input leads which are applied to separate diodes of the gate $G_{21}$. The control signal L is also applied to the gate $G_{21}$. In the case of a binary add, this is normally low simulating a binary "1" input and the gate $G_{21}$ is activated only when both the input signals $(A_2+B_2)$ and $\overline{C}_2$ are present. In the case of a logical add, the level on input L is changed from the normally low to a high value which, in effect, inhibits the gate $G_{21}$. The gate $G_{22}$ receives the carry input signal $C_1$ and the summand signals $\overline{A}_2$, $\overline{B}_2$. The gate $G_{23}$ receives the carry signal $C_1$ and the summand signals $A_2$, $B_2$.

Assuming that the control signal L is in its low condition corresponding to a binary add, the gates $G_{21}$, $G_{22}$ and $G_{23}$ provide the binary output signal $R_2$ corresponding to the binary sum of the two summand numbers and the preceding carry. That the three gates function to produce the desired sum output can be determined by Equation 3 below.

$$(3)\qquad R_k=\underbrace{\overline{C_k}(A_k+B_k)}_{G_{21}}+\underbrace{C_{k-1}\overline{A_k}\cdot\overline{B_k}}_{G_{22}}+\underbrace{C_{k-1}A_k\cdot B_k}_{G_{23}}$$

However, $$(4)\qquad \overline{C_k}=\overline{C_{k-1}A_{k-1}}\cdot\overline{C_{k-1}B_{k-1}}\cdot\overline{A_{k-1}B_{k-1}}$$

Equation 4 implies that $\overline{C}_k$ cannot exist if both $A_{k-1}$ and $B_{k-1}$ exist together. The value of $\overline{C}_k$ in Equation 4 can be substituted into Equation 3 to give:

$$(5)\qquad R_k=\overline{C}_{k-1}A_k\cdot\overline{B}_k+\overline{C}_{k-1}\overline{A}_k\cdot B_k+C_{k-1}\overline{A}_k\cdot\overline{B}_k+C_{k-1}A_k\cdot B_k$$

Equation 5 shows that the sum gate of FIGURE 5 provides the proper binary sum output for all possible input conditions.

The logical sum is obtained from (3) by making $C_{k-1}$="1" and $\overline{C}_k$="0." The $C_{k-1}$ is made equal to "1" by applying the high control level L to the two lower logic circuits of each odd numbered ripple gate, for example the circuits $G_5$ and $G_6$ of FIGURE 2. The $\overline{C}_k$ is made equal to "0" by applying the high control level L to the sum gate $G_{21}$. Equation 6 below proves that the desired logical sum is produced.

$$(6)\qquad R_{kL}=\underbrace{\overline{A}_k\cdot\overline{B}_k}_{G_{22}}+\underbrace{A_k\cdot B_k}_{G_{23}}$$

Figure 6:
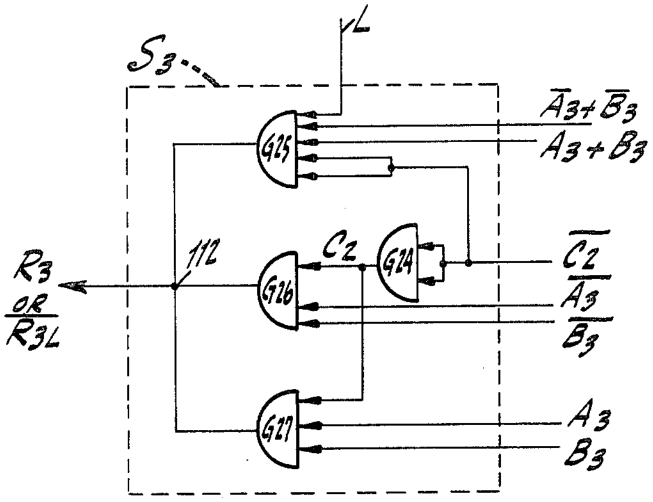

The logic circuit of the second type of sum stage for the odd numbered sums is shown in FIGURE 6 where stage $S_3$ is taken as a typical example. This type of sum gate has four logic circuits $G_{24}$, $G_{25}$, $G_{26}$ and $G_{27}$. The first gate $G_{24}$ serves merely as an inverter to invert the complemented carry signal $\overline{C}_2$ to the true carry signal $C_2$. The carry signal $\overline{C}_2$ is applied also to the logic gate $G_{25}$ which also receives the $(A_3+B_3)$ and $\overline{A}_3+\overline{B}_3$ inputs from the carry anticipation circuitry. The gate $G_{25}$ also receives the signal level L. The gate $G_{26}$ receives the output $C_2$ of the gate $G_{24}$ and the summand signals $\overline{A}_3$ and $\overline{B}_3$. The gate $G_{27}$ receives the carry signal $C_2$ and the summand signals $A_3$ and $B_3$. The three outputs of the gates $G_{25}$, $G_{26}$ and $G_{27}$ are connected to the common point 112 which provides the desired binary sum output $R_3$ or the logical sum output $\overline{R_{3L}}$.

That the gates $G_{24}$ through $G_{27}$ provide the desired sum output $R_3$ when the L control level is low can be determined from Equation 7 below.

(7)

$$R_k=\underbrace{\overline{C_{k-1}}(\overline{A_k\cdot B_k})\overline{(\overline{A_k}\cdot\overline{B_k})}}_{G_{25}}+\underbrace{C_{k-1}(A_k\cdot B_k)}_{G_{26}}+\underbrace{C_{k-1}(\overline{A_k}\cdot\overline{B_k})}_{G_{27}}$$

Further, that the gates $G_{24}$ through $G_{27}$ produce the desired logical sum output $R_{3L}$ when the L control level is high can be determined from Equation 8 below. The high L level inhibits gate $G_{25}$ and causes the $C_2$ input to gates $G_{26}$ and $G_{27}$ to assume a "1" level.

$$R_{kL}=\overline{A}_k\cdot\overline{B}_k+A_k\cdot B_k \tag{8}$$

As described above, the sum stage $S_{13}$ receives a true carry signal $C_{12}$ as the result of an inverter 70. Thus, the sum stage $S_{13}$ is arranged in similar manner to the type of sum stage as shown in FIGURE 5. It should be noted, however, that four transistors are still required, the three of the logic circuits (FIGURE 5) plus inverter 70. The result, however, is that the overall circuitry is simplified in that the $(\overline{A_{13}}+\overline{B_{13}})$ output of anticipation circuit CA2 is not required to be used. Instead, the $(A_{13}+B_{13})$ output is used. This means that the number of gate circuits connected to the $\overline{A_{13}}+\overline{B_{13}}$ output is reduced over that which would otherwise be required. This arrangement also increases the reliability of the $\overline{A_{13}}+\overline{B_{13}}$ ripple gate since it is required to drive fewer output loads.

What is claimed is:

1. In a binary adder, the combination comprising a sum stage arranged to receive input signals representing two summand signals $A_k$ and $B_k$ and input carry signals $C_k$ and $C_{k-1}$ and to provide an output representing either a binary sum of said summand and carry signals or the logical sum of said summand signals, said stage comprising a first gating circuit for receiving as inputs a signal $(A_k+B_k)$ and a signal representing the complement of said carry signal $C_k$ and providing an output only when both said first circuit inputs are present, a second gating circuit for receiving as inputs said carry signal $C_{k-1}$ and the complements of said summand signals $A_k$ and $B_k$ and providing an output only when all said second circuit inputs are present, and a third gating circuit for receiving as inputs said summand signals $A_k$ and $B_k$ and the carry signal $C_{k-1}$ and providing an output only when all said third circuit inputs are present, the outputs of said gates being connected to a common junction point to provide said sum stage output.

2. A sum stage as claimed in claim 1, including means for applying a control level to a further input of said first gating circuit, said stage producing an output representing the logical sum function of said summand signals when said control level is at one value and a signal representing the binary sum function of said input signals when said control level is at another level.

3. In an adder, a plurality of sum stages each arranged for receiving as inputs (1) summand signals and their complements, (2) preceding carry signals, (3) a signal representing a logical "or" function of said summand signals, alternate ones of said sum stages also receiving immediate carry signals, and the other alternate ones of said stages also receiving a signal representing the complement of the logical "or" function of said summand signals, each said stage having three logic circuits a first of said logic circuits receiving as inputs said preceding carry signal and the complements of said summand signals and providing an output only when all said first circuit inputs are present, a second of said logic circuits for receiving as inputs said summand signals and said preceding carry signal and providing an output only when all said second circuit inputs are present, the third of said logic circuits in each one of said alternate stages receiving as inputs said immediate carry signal and a signal representing the logical "or" function of said summand signals and providing an output only when both said third circuit inputs are present, and the third of said logic circuits in each one of said other alternate stages receiving as inputs the complement of said preceding carry signal and signals representing both the logical "or" function and the complement of said logical "or" function of said summand signals, and providing an output only when said last-mentioned inputs are present, and the outputs of the three logic circuits of any one stage being connected together to provide a signal defining the binary sum function for the summand and carry signals of that one stage.

4. In a binary adder device as recited in claim 3, the improvement comprising means for inhibiting the said third logic circuit of each stage and causing each preceding carry signal to assume a level corresponding to a binary "1," whereby the said connected outputs of any one stage provide a signal representing the logical sum function of said summand input signals.

5. In a binary adder device, the combination as recited in claim 4 including high speed carry circuitry arranged to generate signals representing the logical or function and its complement of said summand signals in the process of generating carry signals, and means connecting said third circuits of said alternate sum stages to said high speed carry circuitry.

6. In an adder device for adding a binary number A with a binary number B each number having $n$ digits, high speed carry circuitry having strings of carry ripple gates each arranged for receiving summand signals $A_k$, $B_k$ to produce either a carry signal $C_{k+1}$ or its complement $\overline{C}_{k+1}$, where $k$ is the digit number, said carry signals alternating between true and complemented form, said ripple gates also generating intermediate signals $(A_{+}+B_k)$ and $(\overline{A}_k+\overline{B}_k)$, the improvement comprising $n$ sum stages each having three logic circuits, a first of said circuits receiving a carry signal $C_{k-1}$ and summand signals $A_k$, $B_k$, a second of said circuits receiving a carry signal $C_{k-1}$ and the complements $\overline{A}_k$, $\overline{B}_k$ of said summand signals, the third of said circuits in each alternate one of said sum stages receiving the complement of a carry signal $C_k$ and an intermediate signal $(A_k+B_k)$, and the third of said circuits of each other alternate one of said stages receiving the complement of a carry signal $C_{k-1}$ and intermediate signals $(A_k+B_k)$ and $(\overline{A}_k+\overline{B}_k)$.

7. In an ader device, the combination as recited in claim 6 including means for applying an inhibit signal to each said third circuit.

References Cited by the Examiner

UNITED STATES PATENTS 2,941,721 6/60 Schart et al. ---------- 235—175

FOREIGN PATENTS 1,249,616 11/60 France.

MALCOLM A. MORRISON, *Primary Examiner.*

WALTER W. BURNS, JR., *Examiner.*

UNITED STATES PATENT OFFICE
CERTIFICATE OF CORRECTION

Patent No. 3,198,939 August 3, 1965

Walter A. Helbig et al.

It is hereby certified that error appears in the above numbered patent requiring correction and that the said Letters Patent should read as corrected below.

Column 1, line 14, strike out "(now abandoned)" line 15, after "Helbig" insert -- (now abandoned) --; column 2, line 48, after "one" insert -- is --; column 7, line 23, for "$S_{22}$", second occurrence, read -- $C_{22}$ --; line 57, for "$S^{29}$" read -- $S_{29}$ --; column 10, line 32, for "or" read -- "or" --; line 44, for "$(A_{+}+B_{k})$" read -- $(A_{k}+B_{k})$ --.

Signed and sealed this 5th day of April 1966.

(SEAL)
Attest:

ERNEST W. SWIDER
Attesting Officer

EDWARD J. BRENNER
Commissioner of Patents